Aug. 23, 1938.     S. A. HAYES     2,127,731
SPRAYING APPARATUS
Filed Dec. 14, 1936

INVENTOR
Stanley Hayes
BY
Harry Schroeder
ATTORNEY

Patented Aug. 23, 1938

2,127,731

UNITED STATES PATENT OFFICE 2,127,731

SPRAYING APPARATUS

Stanley A. Hayes, Berkeley, Calif.

Application December 14, 1936, Serial No. 115,673

2 Claims. (Cl. 299—85)

This invention relates to apparatus for mixing together two or more fluid substances, such as water and an insecticide or other disinfectant, and discharging the mixed substances in the form of a finely divided spray which may be directed on to plants, animals or other objects requiring treatment.

It is an object of the invention to provide means whereby the proportions of the ingredients, in a given quantity of the mixed fluids, may be selectively varied during operation of the apparatus.

Another object of the invention is to provide a spraying apparatus which will maintain uniform proportions of the several fluids in the spray mixture.

Still another object of the invention is to provide a sturdily constructed spray apparatus which will withstand a large measure of abuse and neglect, to which devices of this character are usually subjected, without suffering any serious ill effects.

The invention possesses other objects and valuable features, some of which, together with the foregoing, will be specifically set forth in the specification hereunto annexed. It is to be understood that the invention is not to be limited to the particular species thereof shown and described as various embodiments thereof may be employed within the scope of the appended claims.

Referring to the drawing.

Figure 1:
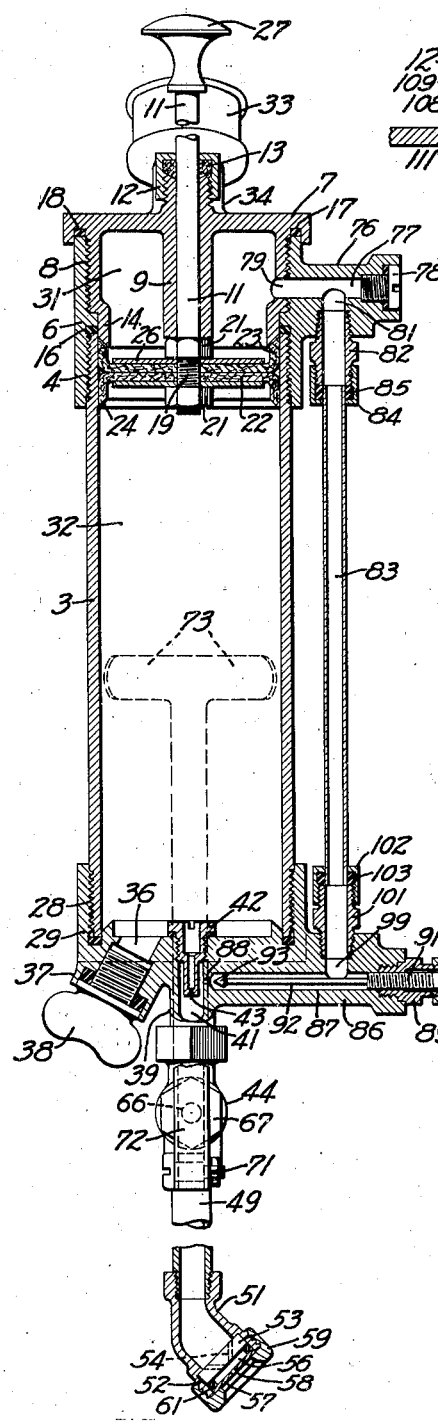
Figure 1 is a vertical sectional view, partly in elevation, of a spraying device incorporating the improvements of my invention.

In detail, the spraying apparatus comprises a cylinder 3 having secured to one end thereof, by threads 4, a sleeve 6 which is provided with a cap 7 closing the end of the cylinder and secured to the sleeve by means of screw threads 8. The cap is provided with a central hub 9, axially bored to slidably receive a piston rod 11, with an outer extension of the hub which is threaded to receive a nut 12 for holding the packing 13 so as to provide a fluid-tight joint between the cap and piston rod, and with an integral skirt portion 14 which extends through a portion of the bore of the sleeve 6 and overlaps the end of the cylinder 3. This construction is to provide a socket for the end of the cylinder into which may be inserted a gasket 16 against which the end of the cylinder seats so as to provide a leakproof connection between the cylinder and the sleeve. The cap 7 is also provided with an annular recess 17 into which a gasket 18 may be placed to render the connection between the cap and sleeve fluidtight. The end of the piston rod 11, within the cylinder, is provided with threads 19 engaged by a pair of nuts 21 between which is secured a piston comprising a pair of cup-shaped leather members 22 having peripheral flanges 23 which are provided with beveled edges 24, and a pair of metal retaining washers 26. The outer end of the piston rod is provided with a knob 27 to provide a hand grip to permit the piston to be manually reciprocated in the cylinder. The opposite end of the cylinder is provided with screw threads 28 which removably secure to the cylinder a cap 29. It will be seen that the piston divides the cylinder into a pair of chambers 31 and 32, the former of which may be supplied with water under pressure from an ordinary garden hose connected to the coupling 33 mounted on the centrally bored hub 34 formed integrally with the cap 7, and the latter of which may be filled with fluid insecticide or the like through a filler opening 36 formed in a hub 37 provided on the cap 29 and sealed by means of a closure plug 38.

The cap 29 is provided with an axially disposed tubular extension 39 constituting a mixture conduit. Into said conduit axially extends a nozzle consisting of a threaded sleeve 42 formed with a restricted orifice 43 through which the fluid contents of the chamber 32 may be discharged into the bore 41. The outer end of the hub is threaded to receive a valve body 44 provided with a passage 46, communicating with the bore 41, and a passage 47 which opens into the bore 48 of a nipple 49 to the outer end of which is threadedly connected a spray head 51 carrying, in the counterbored end portion 52 thereof, a plug 53 which is provided with a plurality of spirally disposed passages 54 so as to impart a whirling motion to the fluid entering the mixing chamber 56, which is provided between the face of the plug 53 and that of a disk 57, the fluid being then discharged through the aperture 58, provided in the disk 57, in the nature of a finely divided spray. A cap 59, which threadedly engages the head 51, serves to retain the plug 53 and the disk 57 in the counterbore 52, and a washer 61 determines the amount of spacing, and consequently the size of the mixing chamber, between the plug and disk.

Figure 2:
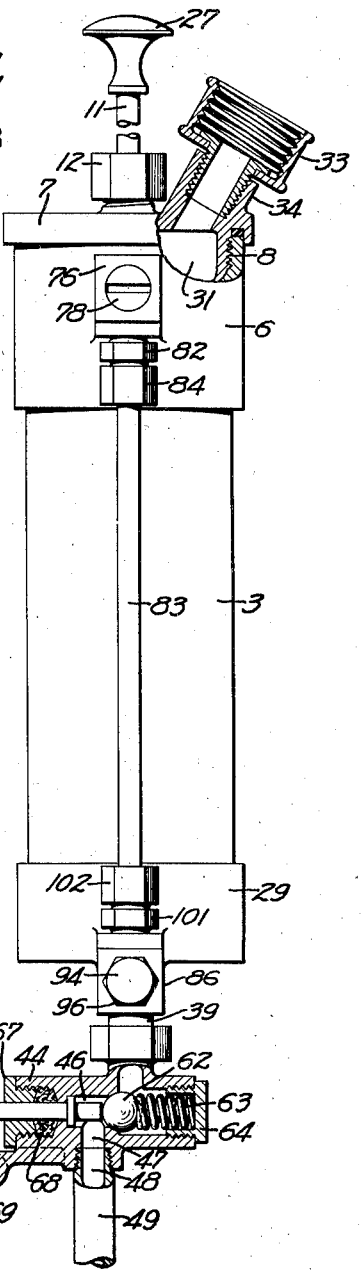
Figure 2 is a side elevational view, partly in section so as to more clearly disclose the interior construction, of the device illustrated in Figure 1.

Means are provided for manually controlling the flow of fluid to the spray head. A ball valve 62 is normally seated in, and closes, the end of the passage 46 by a spring 63 retained in the valve body by a threaded plug 64, and a stem 66 extends from the opposite end of the valve body through the bore of a plug 67 which serves to retain the packing 68 for preventing leakage of fluid outwardly past the stem. The body is provided with a lug 69 having an aperture therein in which is disposed a bolt 71 which serves as a pivot for an operating lever 72, the latter, as will be seen in Figure 2, resting against the outer end of the stem 66. The lever 72 is provided, at its distal end with a pair of oppositely extending finger rests 73, and the upper portion 74 of the lug is flattened so as to limit the upward movement of the lever about the pivot 71. It will be seen that by depressing the lever 72 the ball valve 62 will be forced from its seat thereby permitting communication between the passages 39 and 47—48 through the passage 46.

Means is provided for introducing metered quantities of water into the fluid contents of the chamber 32 as the fluid is discharged therefrom. The sleeve 6 is provided with a radial extension 76 which has therein a bore 77 closed at its outer end by a plug 78 and communicating with the chamber 31 through an aperture 79, formed in the skirt portion 14 of the cap 7, which registers with the bore 77. The extension is also provided with a bore 81 into which is threaded a coupling 82 which receives one end of a conduit 83 extending longitudinally, and closely adjacent the side, of the cylinder 3. A nut 84, which compresses the packing 85 about the end of the conduit within the coupling, serves to provide a fluid-tight joint between the parts. The cap 28 is also provided with an extension 86, similar to the extension 76 of the sleeve 6, having a longitudinal bore 87 terminating, at the end thereof adjacent the passage 41, in a restricted orifice 88, and closed at its outer end by a centrally bored plug 89. It will be observed that the sleeve 42 approximately fills the ends of the mixture conduit 39 adjacent the fluid-container chamber and that it is provided with a reduced extension of less exterior diameter than the diameter of the mixture conduit, said orifice 88 being so located as to discharge fluid into the mixture conduit between the wall thereof and the reduced extension of said nozzle, so that flow of fluid through the nozzle will not interfere with flow of fluid through the orifice and a more or less aspirating effect is produced. A portion of the bore of the plug 89 is threaded to receive the threaded shank 91 of a stem 92 which has formed thereon at one end a needle valve 93 and at the shank end thereof with a knurled knob 94. A cap nut 96 threaded on the end of the plug 89 serves to retain and compress the packing 97 about the unthreaded portion 98 of the shank so as to provide a fluid-tight joint. The extension 86 is also provided with a bore 99 into which is threaded a coupling 101 which receives the other end of the conduit 83, and a nut 102 which retains and compresses the packing 103 about the end of the conduit serves to prevent fluid leakage.

It will be seen that when the coupling 33 is connected to a garden hose through which water under pressure may flow, that pressure will be built up in the chamber 31 and, if the valve 62 is opened so as to vent the chamber 32, the piston will be forced along the cylinder thereby forcing the contents of the latter chamber through the orifice 43, into the passage 39, and thence to the mixing chamber 56 to be presently discharged through the spray head aperture 58. Some of the water in the chamber 31 will, depending upon the degree of opening of the needle valve 93, pass through the passages 77 and 81, the conduit 83, the passages 99 and 87, and the orifice 88, into the passage 41 where it will be mixed with the fluid issuing from the chamber 32 through the orifice 43. It will also be seen that the pressure in the chamber 31, and consequently the speed of movement of the piston axially of the cylinder 3, may be controlled by the needle valve 93 since the greater the opening of the valve, the greater will be the volume of water passing therethrough which serves, by "bleeding off" some of the pressure in the chamber 31, to reduce the pressure behind the piston and thereby reduce the speed at which the latter moves along the cylinder thus resulting in a lesser quantity of fluid from the chamber 32 being discharged through the orifice 88 which will produce a mixture issuing from the spray orifice 58 having a greater proportion of water than insecticide. It is apparent therefore that, by progressively decreasing the opening of the needle valve, the proportion of chemical to water may be increased until, when the valve is completely closed, the fluid issuing from the spray orifice 58 will be entirely composed of undiluted insecticide. It will be seen, from the above, that the strength of the spray solution may be instantly varied while the apparatus is in use by merely adjusting the needle valve to produce the desired dilution of the chemicals by the water. The valve 62 also controls both the movement of the piston and the flow of water through the conduit 83 since, when the valve is closed, no fluid may pass from either the chamber 32 or the passage 87 into the passage 41, hence the piston will be balanced by similar pressures in the chambers 31 and 32 and will therefore be at rest. An important advantage of securing the balancing of pressures in the manner described is that when the operator moves the valve handle to open position material will be discharged in a spray through the spray head 51 and the flow of material is immediately shut off when the valve handle is released. If the control valve were placed between the inlet head and the orifice 88, fluid would be discharged through the spray head upon opening pressure upon the valve handle. However, the pressure would be built up in the device and when the control valve is released there would be a continued discharge through the spray head 51 until the built-up pressure was equalized, thereby resulting in a waste of the spray material.

After the supply of chemical in the chamber 32 has been exhausted, which will be evidenced to the operator by the knob 27 returning to its innermost position adjacent the cap 7, the chamber 32 may be rapidly recharged with fresh chemical by removing the filling opening plug 38, immersing the apparatus in a container of the chemical with the opening 36 below the surface of the chemical and pulling outwardly on the knob 27 which will draw the piston along the cylinder away from the head 28, and by the creation of reduced pressure in the chamber 32 cause the chemical to be drawn thereinto until the chamber is again filled, whereupon the plug 38 may be replaced, the water turned on at the source of supply, and the spraying operation continued.

The spraying apparatus of my invention, which has just been described, is very sturdily constructed, which will be evident upon inspection of the drawing, thus rendering it capable of withstanding, without suffering severe damage, the usual rough handling to which devices of this character are usually subjected. In addition to the above feature, the provision of the single control valve by means of which the strength of the spray solution may be varied instantly and over a wide range renders the spraying apparatus of my invention capable of saving considerable time in spraying operations besides affording the choice of a wide variety of solution strengths at any desired time and during the said operations.

Figure 3:
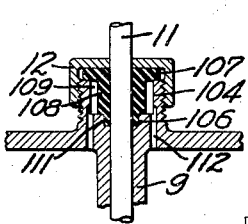
Figure 3 is a vertical sectional view of a modified form of packing gland construction.

In Figure 3 is shown a modified form of packing gland for the piston rod 11 where it passes through the cap 7. While the gland shown in Figure 1 will effectively prevent leakage of water from the chamber 31 past the piston rod, there is the possibility that the user of the spray will tighten the nut 12 excessively, thereby compressing the packing 13 against the piston rod and rendering movement of the latter very difficult. The modified form of packing gland prevents this binding of the packing on the piston rod and in addition effects automatic tightening of the gland as the pressure of water within the chamber 31 increases. The outer extension of the hub 9 is provided with a large counterbore 104 and a smaller continuing counterbore 106. A rubber bushing is provided, about the piston rod 11, having a head or flange 107 which overlies the end of the hub extension, a body portion 108 extending into the counterbore 104 and of lesser diameter than the latter so as to provide an annular chamber 109, and an end extension 111 which seats in the counterbore 106. The nut 12 secures the head 107 between it and the end of the hub extension and drilled passages 112 connect the chamber 31 with the annular chamber 109. It will be seen that regardless of how tightly the nut 12 is screwed down on the hub, the radial pressure on the rubber bushing will not be materially increased thereby allowing free movement of the piston rod through the bushing. However, as soon as the pressure of the water in the chamber 31, rises, which will occur when the control valve is closed, a radial pressure, equivalent to the pressure in the chamber 31, will be exerted on the bushing due to the water in the latter chamber being able to pass into the annular chamber 109 through the passages 112. Thus, regardless of how great the pressure in the chamber 31 may become, the pressure on the bushing will be increased proportionately thereby effecting an efficient seal against the leakage of water from the chamber past the bushing.

I claim:

1. A spraying device of the character described comprising a cylindrical fluid-container chamber, a piston longitudinally movable within said chamber, a cap closing one end of said fluid-container chamber and having a cylindrical pressure chamber therein in axial alignment and in communication with the first mentioned chamber, a cap closing the other end of the fluid-container chamber, said last mentioned cap having a mixture conduit extending axially therethrough, a spray head connected with the discharge end of said mixture conduit, a manually operable valve controlling the passage of fluid to said spray head, a nozzle having an enlarged portion filling the end of the mixture conduit adjacent the fluid-container chamber and having a reduced extension of less exterior diameter than the diameter of said mixture conduit, a passage through the enlarged portion and reduced extension of said nozzle for conducting fluid from said fluid-container chamber into said mixture conduit, said second cap also having a laterally disposed conduit intersecting and communicating with the mixture conduit between the wall of said last mentioned conduit and the reduced extension of said nozzle at a position between the fluid-container chamber and the valve, means for conducting fluid from the pressure chamber into said laterally disposed conduit, and a metering valve in said laterally disposed conduit for controlling the flow of fluid through the last mentioned conduit to the mixture conduit.

2. A spraying device of the character described comprising a cylindrical fluid-container chamber, a piston longitudinally movable within the chamber, an extension sleeve connected with one end of said chamber and in axial alignment therewith, said sleeve having a lateral extension provided with a conduit, a cap engaging the outer end of said sleeve so as to close the fluid-container chamber and having a cylindrical pressure chamber therein communicating with the laterally disposed conduit of said sleeve and also in communication with the first mentioned chamber, a cap closing the other end of the fluid-container-chamber, said last mentioned cap having a mixture conduit extending axially therethrough, a spray head connected with the discharge end of said mixture conduit, a manually operable valve controlling the passage of fluid to said spray head, a nozzle having an enlarged portion filling the end of the mixture conduit adjacent the fluid-container chamber and having a reduced extension of less exterior diameter than the diameter of the mixture conduit, a passage through the enlarged portion and reduced extension of said nozzle for conducting fluid from the fluid-container chamber into the mixture conduit, said second cap also having a laterally disposed conduit intersecting and communicating with the mixture conduit between the wall of said conduit and the reduced extension of said nozzle at a position between the fluid-container chamber and the valve, a conduit connecting the lateral conduit of said sleeve with the lateral conduit of said last mentioned cap, and a metering valve in the laterally disposed conduit of said last mentioned cap for controlling the flow of fluid therethrough to the mixture conduit.

STANLEY A. HAYES.